United States Patent [19]

Chau et al.

[11] Patent Number: 5,082,640
[45] Date of Patent: Jan. 21, 1992

[54] METHOD OF MAKING LUMINESCENT GRADE BORON PHOSPHATE

[75] Inventors: Chung N. Chau, Sayre, Pa.; Jeffrey A. Smith, Columbia, Md.

[73] Assignee: GTE Products Corporation, Stamford, Conn.

[21] Appl. No.: 749,388

[22] Filed: Aug. 23, 1991

[51] Int. Cl.$^5$ .............................................. C01B 35/10
[52] U.S. Cl. .............................. 423/277; 252/301.4 P; 423/304
[58] Field of Search ............................. 423/277, 304; 252/301.4 P

[56] References Cited

U.S. PATENT DOCUMENTS

| | | | |
|---|---|---|---|
| 2,375,638 | 5/1945 | Englund | 423/277 |
| 2,646,344 | 7/1953 | Kamlet | 423/277 |
| 3,395,984 | 8/1968 | Collins | 423/277 |
| 4,185,222 | 1/1980 | van den Boom et al. | 423/277 |

FOREIGN PATENT DOCUMENTS 1161178  6/1985  U.S.S.R. .............................. 423/277

OTHER PUBLICATIONS

Ashboren "Israel J. of Chem.", vol. 12, No. 4, (1974) pp. 831–837.
Braver, "Handbook of Preparative Inorganic Chemistry", vol. 1, pp. 796–797, (1963).

*Primary Examiner*—Jack Cooper
*Attorney, Agent, or Firm*—Elizabeth A. Levy

[57] ABSTRACT

Luminescent grade, small particle size boron phosphate is prepared by reacting diammonium phosphate with an excess amount of boric acid and washing the product with ammonium hydroxide solution.

3 Claims, 3 Drawing Sheets

METHOD OF MAKING LUMINESCENT GRADE BORON PHOSPHATE

This application discloses information contained in copending U.S. patent application Ser. No. 07/522,618, entitled "Method of Making Luminescent Grade Boron Phosphate", filed on May 14, 1990 by C. Chau and assigned to the assignee of the instant application.

TECHNICAL FIELD

This invention relates to a process for making luminescent grade, small particle size boron phosphate for use in the synthesis of fluorescent lamp phosphors.

BACKGROUND ART

U.S. Pat. No. 2,646,344 to Kamlet discloses a single-step method of making boron phosphate. Phosphorus pentoxide and boric anhydride are reacted in equimolar amounts at between 577° C. and 1000° C. to form a solid white mass of boron phosphate that can be ground to a desired fineness.

U.S. Pat. No. 3,395,984 to Collins also discloses a single-step method of making boron phosphate. Equimolar amounts of phosphoric acid and ammonium biborate are heated rapidly to 200°-350° C. to form a dry, porous product.

A two-step method of making boron phosphate is outlined in Brauer, *Handbook of Preparative Inorganic Chemistry*, Vol. 1, p. 796 (1963). Equivalent amounts of boric acid and phosphoric acid are mixed and heated at about 100° C. to form a paste which is then crystallized by firing for 2 hours at 1000° C. Alternatively, monoammonium phosphate may be substituted for phosphoric acid in the reaction.

SUMMARY OF THE INVENTION

The prior art methods of making boron phosphate result in a product suitable for use as a catalyst in various organic reactions. However, the impurities present in boron phosphate made by these methods render it unsuitable for use in the synthesis of phosphors used in fluorescent lamps.

The present invention obviates this disadvantage by providing a single-step method of making luminescent grade, small particle size boron phosphate.

In accordance with the invention there is provided a method of making luminescent grade boron phosphate according to the reaction

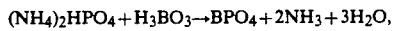

comprising the steps of: combining boric acid and diammonium phosphate in a molar ratio of at least 1.3 moles of boric acid to 1 mole of diammonium phosphate to form a blended mixture; firing the mixture at about 1000° C. for about 2 hours in air to form the boron phosphate; and washing the boron phosphate with a solution of ammonium hydroxide.

BRIEF DESCRIPTION OF THE DRAWINGS

FIG. 1 is a series of scanning electron micrographs which illustrate the decrease in boron phosphate particle size as the ratio of boric acid to diammonium phosphate increases.

FIG. 2 is a set of scanning electron micrographs which illustrate the particle size reduction effect of an ammonium hydroxide wash on boron phosphate made with a 1.3:1 molar ratio of boric acid to diammonium phosphate.

BEST MODE FOR CARRYING OUT THE INVENTION

Figure 1A:
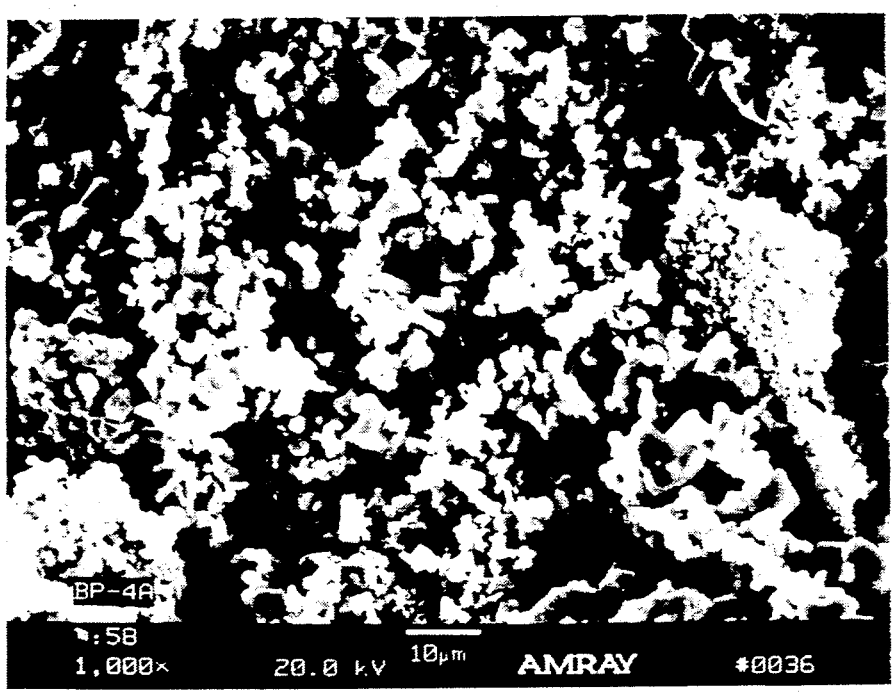
FIG. 1A illustrates a 1.1:1 molar ratio of boric acid to diammonium phosphate.
Figure 1B:
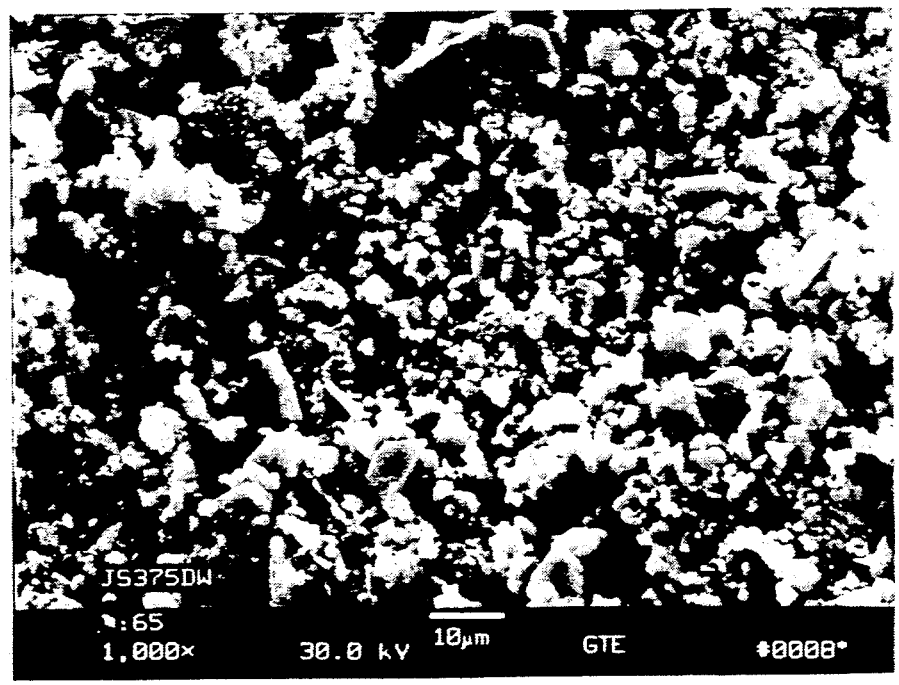
FIG. 1B illustrates a 1.3:1 molar ratio of boric acid to diammonium phosphate.
Figure 1C:
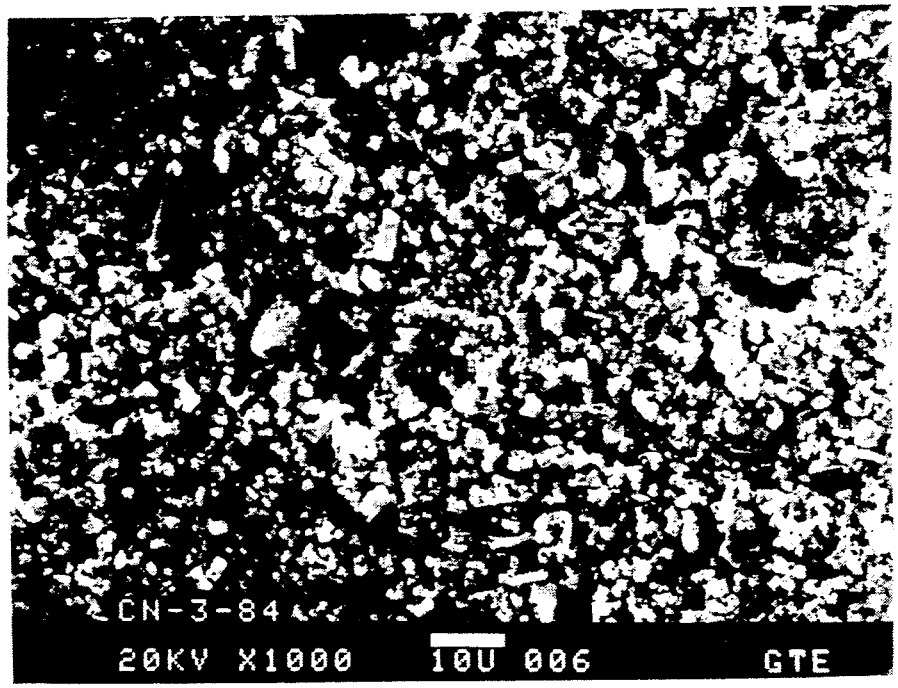
FIG. 1C illustrates a 1.5:1 molar ratio of boric acid to diammonium phosphate.
Figure 2A:
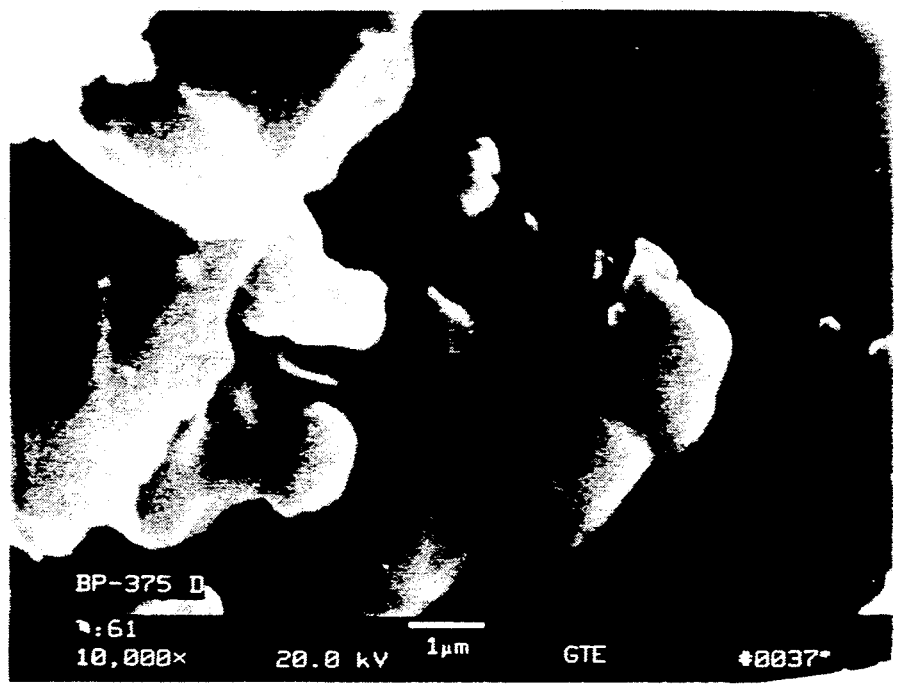
FIG. 2A illustrates the boron phosphate particle morphology before washing.
Figure 2B:
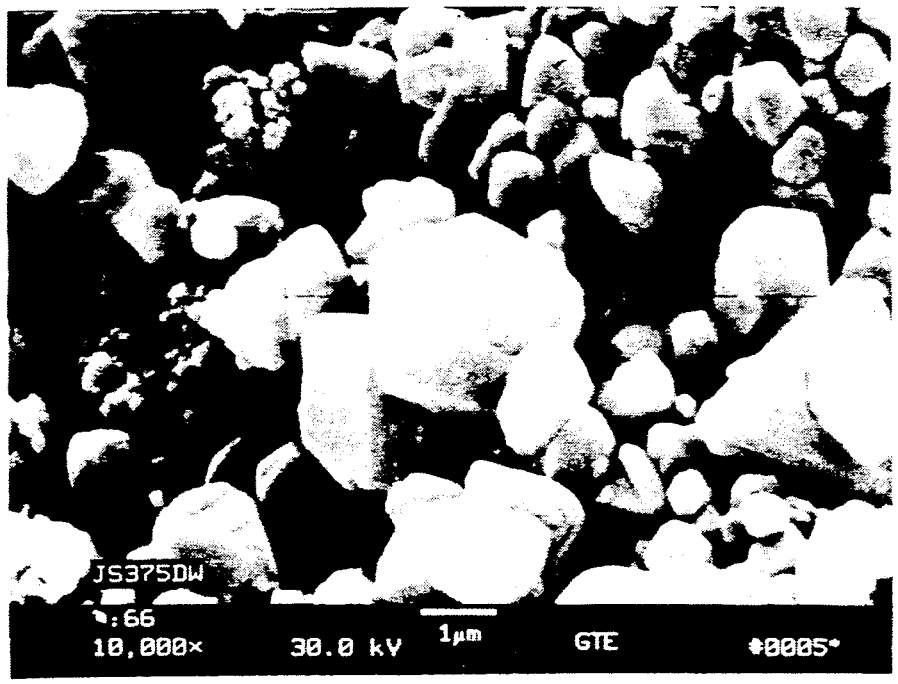
FIG. 2B illustrates the boron phosphate particle morphology after washing.

For a better understanding of the present invention, together with other and further objects, advantages and capabilities thereof, reference is made to the following disclosure and appended claims.

Boron phosphate has been found to be a useful reagent for the preparation of fluorescent lamp phosphors such as, for example, lanthanum cerium terbium phosphate phosphor. To obtain high brightness phosphors, reagents having very low impurities must be used. The presence of even minute amounts of iron in the phosphor causes radiated energy to be dissipated in the non-visible range of the spectrum instead of luminescing in the visible range. Titanium dioxide, another low-level raw material impurity, is a good absorber of ultraviolet energy. It will act to preferentially absorb ultraviolet radiation, thus preventing the use of that radiation to stimulate the phosphor to fluorescence. Minute amounts of copper and potassium impurities tend to form an amalgam with mercury from the mercury discharge excitation used to stimulate fluorescent lamp phosphors. The result is lower maintenance values in fluorescent lamps.

The method of the present invention is a single-step reaction of boric acid and diammonium phosphate to form luminescent grade boron phosphate, that is, a boron phosphate having a very low level of impurities. The reaction can occur in a single step because the reactants are solids: boric acid is either crystalline or in powder form, and diammonium phosphate is crystalline. Thus, the solid reactants need not be evaporated from a solution in a first separate step before they can react to form boron phosphate.

The equation for the synthesis of boron phosphate by the method of this invention is as follows:

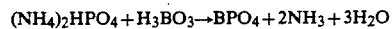

Diammonium phosphate, $(NH_4)_2HPO_4$, is the most stable and the most easily obtained ammonium phosphate compound. It is obtained when the reaction of phosphoric acid and ammonium hydroxide reaches its equilibrium point. The formation of diammonium phosphate in this reaction is favored over the formation of either monoammonium phosphate or triammonium phosphate.

Although the boric acid and diammonium phosphate reactants may be combined in approximately equal molar amounts, an excess of boric acid is preferred to prevent the formation of polyphosphates, such as $P_2O_7$, which have different reactivity characteristics from monophosphate, $PO_4$, and act to reduce the brightness of phosphors made with this reagent. A 1.1:1.0 ratio of boric acid: diammonium phosphate may be used; however, a 1.3:1.0 ratio of boric acid: diammonium phosphate is preferred, and a 1.5:1.0 ratio of boric acid: diammonium phosphate is especially preferred.

The boric acid and diammonium phosphate reactants are blended to obtain a relatively uniform mixture. The particle sizes of the reactants are not critical because, when fired, water and ammonia vapors are released, causing the product to foam and significantly increase in volume. The resulting agitation of the molten reactants creates a relatively homogeneous mixture. The resulting boron phosphate is a dry, porous material that is easily reduced to a fine, fluffy powder.

The following non-limiting example is presented.

EXAMPLE I

One mole (1320.0 grams) of diammonium phosphate, $(NH_4)_2HPO_4$, was combined with 1.1 mole (680.1 grams) of boric acid, $H_3BO_3$ in a ten-quart plastic blender and V-blended for 15 minutes followed by 15 minutes of blending with an intensifying bar. The mixture was fired in air at 1000° C. for two hours. The fired boron phosphate cake was broken up and sifted through a 200 mesh screen. The 50% Coulter counter size was between 4 and 8 micrometers. The level of impurities in the resulting luminescent grade boron phosphate, as determined by spectrographic qualitative analysis, is shown in Table I.

TABLE I

| IMPURITIES LEVEL IN LUMINESCENT GRADE BORON PHOSPHATE ||
|---|---|
| Si | 10–100 ppm |
| Ca | 1–10 ppm |
| Na | 1–10 ppm |
| Mg | less than 1 ppm |
| Fe | less than 1 ppm |
| $TiO_2$ | less than 1 ppm |
| Cu | less than 1 ppm |
| K | less than 1 ppm |

The particle size of the boron phosphate can be decreased by increasing the molar ratio of boric acid to diammonium phosphate and by washing the resulting boron phosphate with ammonium hydroxide solution. Instead of a molar ratio of boric acid: diammonium phosphate of 1.3:1.0, the amount of boric acid used is increased to, preferably, a 1.5:1.0 molar ratio. The resulting boron phosphate is then washed with ammonium hydroxide solution to deagglomerate it and rinse away excess boric acid. The following non-limiting examples are presented.

EXAMPLE II

One mole (1320.0 grams) of diammonium phosphate, $(NH_4)_2HPO_4$, was combined with 1.3 moles (803.8 grams) of boric acid, $H_3BO_3$, in a ten-quart plastic blender and V-blended for 15 minutes followed by 15 minutes of blending with an intensifying bar. The mixture was fired in air at 1000° C. for two hours. The fired boron phosphate cake was broken up and sifted through a 200 mesh screen. The 50% Coulter Counter size is given in Table II.

EXAMPLE III

One mole (1320.0 grams) of diammonium phosphate, $(NH_4)_2HPO_4$, was combined with 1.5 moles (927.5 grams) of boric acid, $H_3BO_3$, in a ten-quart plastic blender and V-blended for 15 minutes followed by 15 minutes of blending with an intensifying bar. The mixture was fired in air at 1000° C. for two hours. The fired boron phosphate cake was broken up and sifted through a 200 mesh screen. The 50% Coulter Counter size is given in Table II.

EXAMPLE IV

One mole (1320.0 grams) of diammonium phosphate, $(NH_4)_2HPO_4$, was combined with 1.3 moles (803.8 grams) of boric acid, $H_3BO_3$, in a ten-quart plastic blender and V-blended for 15 minutes followed by 15 minutes of blending with an intensifying bar. The mixture was fired in air at 1000° C. for two hours. The fired boron phosphate cake was broken up and washed with a 1% solution of ammonium hydroxide, $NH_4OH$, in deionized water and then sifted through a 200 mesh screen. The 50% Coulter Counter size is given in Table II.

EXAMPLE V

One mole (1320.0 grams) of diammonium phosphate, $(NH_4)_2HPO_4$, was combined with 1.5 moles (927.5 grams) of boric acid, $H_3BO_3$, in a ten-quart plastic blender and V-blended for 15 minutes followed by 15 minutes of blending with an intensifying bar. The mixture was fired in air at 1000° C. for two hours. The fired boron phosphate cake was broken up and washed with a 1% solution of ammonium hydroxide, $NH_4OH$, in deionized water and then sifted through a 200 mesh screen. The 50% Coulter Counter size is given in Table II.

TABLE II

| BORON PHOSPHATE PARTICLE SIZE WITH INCREASED BORIC ACID: DAP RATIO AND AMMONIUM HYDROXIDE WASH ||| 
|---|---|---|
| | COULTER COUNTER PARTICLE SIZE ||
| | 5 MIN. STIR | 5 MIN. SONIC |
| EXAMPLE II (1.3:1/unwashed) | 13.88 | 6.94 |
| EXAMPLE III (1.5:1/unwashed) | 7.45 | 5.57 |
| EXAMPLE IV (1.3:1/washed) | 7.20 | 5.58 |
| EXAMPLE V (1.5:1/washed) | 6.39 | 4.69 |

Table II indicates that with an increasing boric acid:-DAP ratio, the particle size of the resulting boron phosphate decreases. Washing the resulting boron phosphate in ammonium hydroxide solution further decreases the particle size.

While there has been shown and described what are at present considered the preferred embodiments of the invention, it will be obvious to those skilled in the art that various changes and modifications may be made therein without departing from the scope of the invention as defined by the appended claims.

I claim:

1. A method of making luminescent grade boron phosphate according to the reaction $$(NH_4)_2HPO_4 + H_3BO_3 \rightarrow BPO_4 + 2NH_3 + 3H_2O,$$

comprising the steps of:
  a) combining boric acid and diammonium phosphate in a molar ratio of at least 1.3 moles of boric acid to 1 mole of diammonium phosphate to form a blended mixture;
  b) firing said mixture at about 1000° C. for about 2 hours in air to form said boron phosphate; and
  c) washing said boron phosphate with a solution of ammonium hydroxide.

2. The method of claim 1 wherein said boric acid and said diammonium phosphate are combined in a molar ratio of 1.5 moles of boric acid to 1 mole of diammonium phosphate.

3. The method of claim 1 wherein said mixture becomes molten during said firing step and wherein water and ammonia vapors formed are released from said molten mixture, causing said molten mixture to foam and become homogeneously mixed.

* * * * *